Dec. 8, 1970 L. P. DAGUE 3,546,611
HIGH VOLTAGE WIDE BAND AMPLIFIER
Filed July 1, 1968
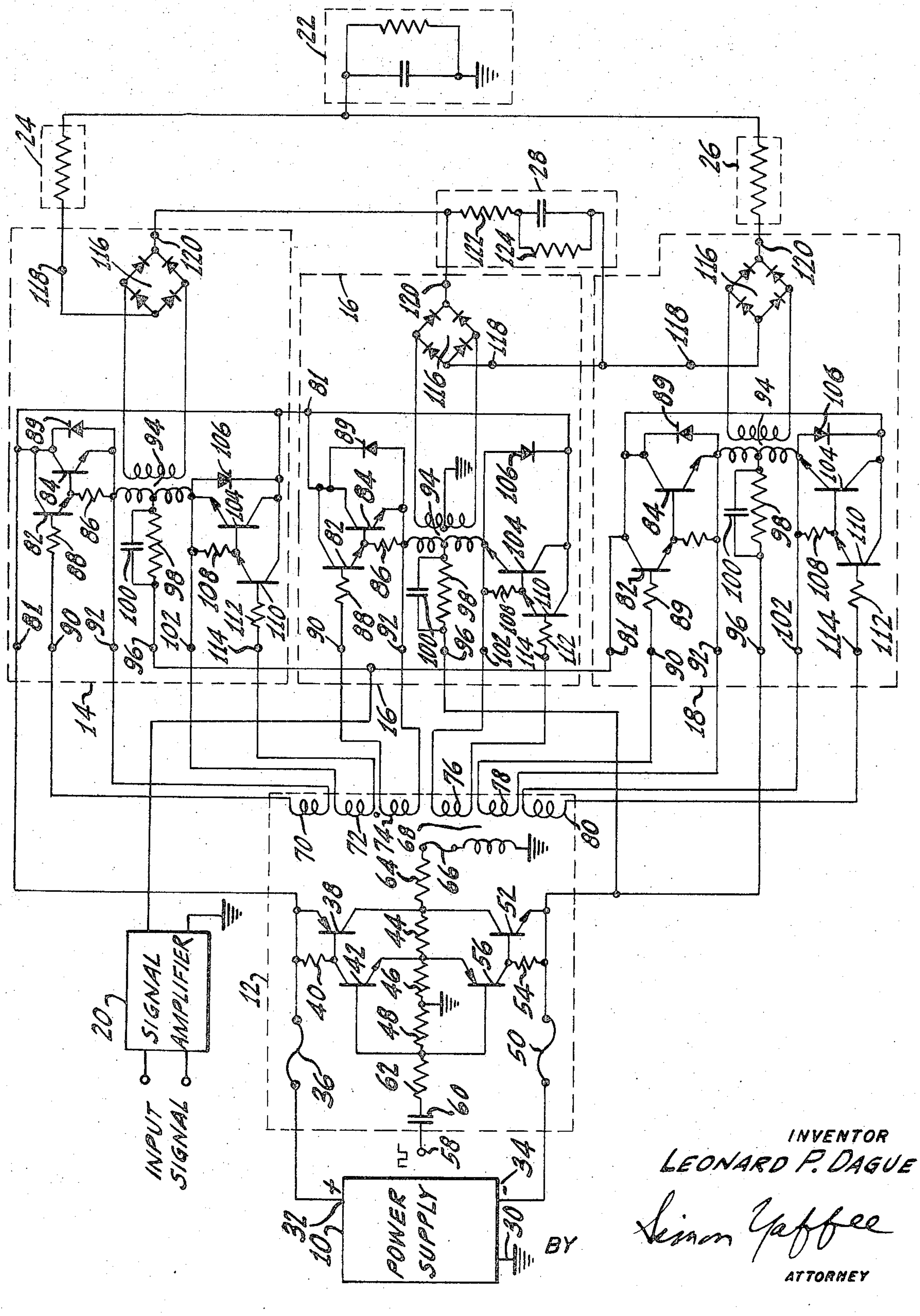
INVENTOR
LEONARD P. DAGUE
BY Simon Yaffee
ATTORNEY

1

3,546,611
HIGH VOLTAGE WIDE BAND AMPLIFIER

Leonard P. Dague, Cherry Hill, N.J., assignor to RCA Corporation, a corporation of Delaware Filed July 1, 1968, Ser. No. 741,618
Int. Cl. H03f 3/26, 3/04
U.S. Cl. 330—13 3 Claims

ABSTRACT OF THE DISCLOSURE

A solid state amplifier, including a plurality of DC-to-DC converters, particularly suitable for feeding a capacitive load, and having a frequency range of DC to about 100 kilocycles per second or higher and which may provide an output of up to 10,000 or more volts.

The invention herein described was made in the course of or under a contract or subcontract thereunder with the Department of the Air Force.

BACKGROUND

For certain purposes, for example to operate a light deflecting device, a high voltage, such as 10,000 volts, must be supplied to a capacitive load. The operating signal may vary in frequency from direct current to 100 kilocycles per second or higher. To obtain the required high voltage output, the operating or input signal can be applied to a DC-to-DC converter, whereby, by the proper choice of the turns ratio of the transformer comprising part of the converter, an output in the proper voltage range is obtained. When the output of the converter is applied to a capacitive load, the voltage of the capacitive load will follow the output of the converter in a voltage increasing direction. However, in a voltage decreasing direction, the voltage of the capacitive load will lag the voltage applied thereto by the converter, whereby the voltage across the load will not follow the original voltage. If two DC-to-DC converters are used, one to drive the voltage across the capacitive load in one direction, and the other to drive the voltage across the capacitive load in the opposite direction, the connection of the two converters to the load can result in a shortcircuiting of the converters.

SUMMARY

In accordance with the invention, an amplifier is provided comprising two DC-to-DC converters, each of which converts the input signal to a high voltage, the converters being arranged to apply their outputs to the same terminal of a load, means being provided to prevent shortcircuiting of the two converters due to their connection to the load. As a feature of the invention, the converters are biased by a power supply and are driven by the amplified input signal. As another feature of the invention, the means to prevent shortcircuiting the two converters comprises a third DC-to-DC converter.

DESCRIPTION

The invention will be better understood upon reading the following description in connection with the accompanying drawing, partially in block form, of a circuit diagram of apparatus including an embodiment of this invention.

As shown in the drawing, a power supply 10 provides power for the system to be described which includes a signal switching amplifier contained in the dotted rectangle 12. The power supply 10 also provides power for three substantially identical DC-to-DC converters contained respectively in the dotted rectangles 14, 16 and 18. A signal amplifier 20 is provided to vary or modulate the input to and therefore the output of, the converters 14 and 18.

2

The outputs of the converters 14 and 18 are connected to the same terminal of a capacitive load 22 by way of respective limiters 24 and 26. A filter circuit 28 is connected across the output terminals of the converter 16.

The power supply 10 may be any known power supply that has a grounded output terminal 30, a positive output terminal 32 and a negative output terminal 34, the voltages at the positive and the negative terminals 32 and 34 being substantially equal with respect to the grounded terminal 30 and of an appropriate level.

The switching signal amplifier 12 is fed from the terminals 30, 32 and 34 of the power supply 10. A fuse 36, which may be part of the amplifier 12, is connected between the terminal 32 and the emitter of a PNP transistor 38. A resistor 40 is connected from the junction of the fuse 36 and the emitter of transistor 38 to the base of the transistor 38 and to the collector of a NPN transistor 42. The emitter of the transistor 42 is connected to the collector of the transistor 38 by way of a resistor 44. Two resistors 46 and 48 are connected between the emitter of the transistor 42 and its base, the connection point between the resistors 46 and 48 being grounded. In a similar manner, the terminal 34 of the source 10 is connected through a fuse 50 to the emitter of a NPN transistor 52 whose base is connected to its own emitter by way of a resistor 54. The base of the transistor 52 is connected to the collector of a PNP transistor 56 whose emitter is connected to the emitter of the transistor 42 and whose base is connected to the base of the transistor 42. A square wave is applied to a terminal 58 which is connected to the bases of the transistors 42 and 56 by way of a capacitor 60 and a resistor 62 in series. The output of the amplifier 12 is taken from the collectors of the transistors 38 and 52 by way of a resistor 64, a fuse 66 and the primary winding of a switching signal transformer 68, connected in series to ground. Six secondary windings 70, 72, 74, 76, 78 and 80 are shown for the switching signal transformer 68. The switching signal amplifier 12 applies a square wave, similar to that applied to the input terminal 58, to the apparatuses (here the DC-to-DC converters 14, 16 and 18) to which the secondary windings 70, 72, 74, 76, 78 and 80 are connected. The fuses 36 and 50 protect the complete system to be described, since as will be made clear, all power delivered to the complete system passes through the fuses 36 and 50. The resistors 44 and 46 provide negative feedback in the amplifier 12 to hereby make the output wave provided thereby more nearly an accurate amplification of the input square wave. The connection of the transistors 38 and 42 on the one hand and of the transistors 52 and 56 on the other hand is to reduce the necessary current drive from the switching signal source. The switching signal transformer 68 provides the required switching signals from a single signal source and also provides the necessary isolation between the signals.

The three DC-to-DC converters 14, 16 and 18 are substantially identical, whereby only one will be described in detail and the same reference characters will be used in each to indicate similar elements similarly connected.

Considering the DC-to-DC converter 14, first, the positive bias input terminal 81 thereof is connected to the collectors of two NPN transistors 82 and 84. The base of the transistor 84 is connected to its own emitter by way of a resistor 86, the base of the transistor 84 also being connected to the emitter of the transistor 82. The base of the transistor 82 is connected to a switching signal input terminal 90 by way of a resistor 88. The anode and cathode of a protective diode 89 are connected respectively to the emitter and collector of the transistor 84. The diode 89 prevents the emitter of the transistor 84 from going appreciably more positive than its collector. The emitter of the transistor 84 is connected to another switching input terminal 92 and to one terminal of the primary winding of an output transformer 94. A center tap on the primary winding of the transformer 94 is connected to a negative bias input terminal 96 by way of a resistor 98 which is shunted by a capacitor 100. The resistor 98 and the capacitor 100 provide critical damping of the converter 14 to prevent ringing thereof. The other end of the primary winding of the output transformer 94 is connected to a further switching input terminal 102, to the emitter of a NPN transistor 104 and to the anode of a protective diode 106. The diode 106 prevents the emitter of the transistor 104 from becoming appreciably more positive than its collector. The base of the transistor 104 is connected to its own emitter by a resistor 108. The base of the transistor 104 is also connected to the emitter of an NPN transistor 110. The collectors of the transistors 104 and 110 and the cathode or the diode 106 are all connected together and to the positive bias input terminal 81. The base of the transistor 110 is connected through a resistor 112 to a further switching input terminal 114. The secondary winding of the transformer 94 is connected across the input terminals of a rectifier bridge 116. The negative output terminal 118 and the positive output terminal 120 of the DC-to-DC converter 14 are connected to the respective negative and positive terminals of the bridge 116.

The DC-to-DC converters 16 and 18 are substantially identical to the converter 14. A center tap of the secondary winding of the output transformer 94 of the converter 16 is grounded. While the output transformer secondary windings of the converters 14 and 18 may have center taps, these last mentioned center taps are not used.

The positive terminal 32 of the power or bias supply 10 is connected to the positive bias terminal 81 of the converter 14 by way of the fuse 36. The negative terminal 34 of the supply 10 is connected to the negative bias terminal 96 of the converter 18 by way of the fuse 50. The negative bias terminal 96 of the converter 14 is connected to the positive bias terminal 81 of the converter 18, whereby the converters 14 and 18 are biased in series by the power supply 10. The positive bias terminal 81 of the converter 16 is connected, through the fuse 36, to the positive terminal 32 of the power supply 10, and the negative bias terminal 96 of the converter 16 is connected through the fuse 50 to the negative terminal 34 of the supply 10, whereby, as will be pointed out, the converter 16 acts as a high voltage bias power supply. Due to the connection of the fuses 36 and 50, they protect the described system. The positive output terminal 120 of the converter 14 is connected to the positive output terminal 120 of the converter 16, and the negative output terminal 118 of the converter 16 is connected to the negative output terminal 118 of the converter 18. Furthermore, the filter 28, which comprises two resistors 122 and 124 in series, the resistor 124 being shunted by a capacitor 126, is connected across the output terminals 118 and 120 of the converter 16.

The switching signal transformer secondary winding 70 is connected across the switching input terminals 90 and 92, and the transformer secondary winding 72 is connected across the input switching terminals 102 and 114 of the converter 14 in a manner to apply out of phase square waves to the transistors 82 and 110, whereby current flows into the terminal 81 and through the two halves of the primary winding of the output transformer 94 alternately and back out through the terminal 96 of the converter 14. The voltage induced in the secondary winding of the output transformer 94 depends on the turns ratio of the transformer 94 and upon the voltage applied across the terminals 81 and 96. The alternating current flowing in the output transformer 94 secondary winding is rectified by the bridge 116 and a voltage appears across the terminals 120 and 118 of the converter 14 that is equal to a constant, determined by the turns ratio of the output transformer 94, multiplied by the voltage applied across the terminals 81 and 96. Similarly, the switching signal transformer secondary winding 74 is connected to the switching terminals 90 and 92, and the secondary winding 76 is connected to the switching terminals 102 and 114 of the converter 16. Furthermore, the switching signal transformer secondary winding 78 is connected to the switching terminals 90 and 92 and the transformer secondary winding 80 is connected to the switching terminals 102 and 114 of the converter 18.

The signal amplifier 20 may be any known amplifier which will amplify without excessive distortion a sufficient band of waves, for example, DC up to about 100 kilocycles per second and which will produce sufficient power output to drive the load thereon, for example about 75 watts at an appropriate voltage level. The output terminal of the amplifier 20 is connected to the junction of the negative bias terminal 96 of the converter 14 and the positive bias terminal 81 of the converter 18.

The negative output terminal 118 of the converter 14 is connected through the current limiter 24 to one terminal of the load 22, which may be capacitive as shown. The positive output terminal 120 of the converter 18 is connected by way of the limiter 26 to the same terminal of the load 22 as is connected to the negative output terminal of the converter 14. As shown, the limiters 24 and 26 may be simple resistors for some applications. The other load terminal is grounded.

In explaining the operation of the described amplifier, let it first be assumed that the converter 16 is omitted and the positive output terminal 120 of the converter 14 is connected to ground and the negative output terminal 118 of the converter 18 is also connected to ground. Then the two converters 14 and 18 would be shortcircuited and an excessive current would circulate through the two converters 14 and 18 and destroy them. Therefore, the connection of the two DC-to-DC converters 14 and 18 to a load, one connected to assist in raising the voltage and the other connected to assist in lowering the voltage across the load 22 would not achieve the desired result. In the circuit shown, the continuous fixed positive voltage appearing at the output terminal 120 of the converter 16 is applied to the positive output terminal 120 of the converter 14, and the continuous fixed negative output potential appearing at the terminal 118 of the converter 16 is applied to the negative output terminal 118 of the converter 18, whereby there is no shortcircuit between the outputs of the converters 14 and 18 and whereby the output of the converters 14 and 18 drive the load 22 in the desired manner.

As noted above, the purpose of the converter 16 is to provide a steady equal amplitude plus and minus voltage source, the same amplitude as that provided between the output terminals of the converters 14 and 18 when the junction of the negative bias terminal 96 of the converter 14 and the positive bias terminal 81 of the converter 18 is at ground potential. The filter 28 is provided to assure that the load can be both charged and discharged with either polarity. A different voltage supply of the proper voltage and power rating may be substituted for the converter 16 without materially affecting the operation of the system. However, use of the converter 16 offers the advantage of eliminating the expense of an additional, separate high voltage source. Furthermore, the output voltage of the converter 16 will track the sum of the output voltage of the converters 14 and 18 as the power supply 10 voltage varies resulting in reduced strain on the current limiters due to changes in power supply voltage. The limiters 24 and 26 are provided in case the converters 14, 16 and 18 do not provide identical amplification, whereby the limiters 24 and 26 limit the circulating current that results from this lack.

The voltage outputs of the converters 14 and 18 are varied in opposite direction by the connection of the output of the amplifier 20 to the junction of the negative bias input terminal 96 of the converter 14 and the positive bias input terminal 81 of the converter 18. That is, as the voltage of the output of the amplifier 20 goes up or becomes more positive, less voltage is applied across the power input terminals 81 and 96 of the converter 14 and more voltage is applied across the power input terminals 81 and 96 of the converter 18, whereby the variation in voltage so provided is multiplied by the constant (noted above) or the converters 14 and 18, and whereby a low power signal applied at the input to the signal amplifier 20 is applied as a high power signal across the load at a different voltage level. Therefore, the frequency components of a low voltage low power input signal applied to the input of the signal amplifier 20 which lie in the range that is amplified by the amplifier 20 appear at a much higher voltage level at the same relative amplitude at the output of the converters 14 and 18 and are applied across the load 22.

What is claimed is:

1. Means to impress a signal on a load, comprising:

a pair of D.C. to D.C. converters each having input terminals and a positive and a negative output terminal;

means for coupling the input terminals of said converters to an electrical power source to cause a voltage to be developed between the output terminals of each converter;

direct current means by which the positive output terminal of one converter and the negative output terminal of the other converter can be conductively connected to the same terminal of a load;

bias means to impress a negative bias voltage on the negative output terminal of said one converter and to impress a positive bias voltage on the positive output terminal of said other converter, said bias voltages being measured with respect to a point of reference potential which is D.C. connectable to the other terminal of said load, the values of said bias voltages and of the voltages across the output terminals of said converters being maintained at values such that substantially no circulating current flows between the interconnected output terminals of said converters; and means coupled to complementary input terminals of said converters, said means responsive to a signal connected for selectively (ii) increasing the voltage developed between output terminals of one of said converters while simultaneously decreasing the voltage developed between the output terminals of the other converter, and (iii) increasing the voltage developed between the output terminals of said other converter while simultaneously decreasing the voltage developed between the output terminals of said one converter, whereby the magnitude and polarity of the voltage across said load may be varied by said control signal.

2. The invention as expressed in claim 1, wherein said bias means includes a third D.C. to D.C. converter whose input terminals are connected to said electrical power source.

3. The invention according to claim 1 wherein, when said signal is quiescent, the potential difference between the output terminals of each converter is equal to the bias voltage, with respect to said point of reference potential, on the remaining terminal thereof, whereby the interconnected terminals of said converters are situated at said reference potential.

References Cited

UNITED STATES PATENTS

| | | | |
|---|---|---|---|
| 3,227,940 | 1/1966 | Gilbert et al. | 321—27X |
| 3,262,060 | 7/1966 | Gobin | 330—13 |
| 3,375,455 | 3/1968 | Motta | 330—13 |
| 3,440,551 | 4/1969 | Marud et al. | 330—13 |

NATHAN KAUFMAN, Primary Examiner

U.S. Cl. X.R.

330—30, 24, 19, 40